US 6,643,279 B1

(12) United States Patent
Li et al.

(10) Patent No.: US 6,643,279 B1
(45) Date of Patent: Nov. 4, 2003

(54) HANDOFF CONTROL FOR POINT TO MULTIPOINT CONNECTIONS IN MOBILE ATM NETWORKS

(75) Inventors: Jun Li, Piscataway, NJ (US); Arup Acharya, North Brunswick, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/145,225

(22) Filed: Sep. 1, 1998

(51) Int. Cl.[7] .............................................. H04L 12/56

(52) U.S. Cl. ....................... 370/331; 455/436

(58) Field of Search ............................ 370/238, 310.1, 370/331, 332, 333, 395.51, 401; 455/436, 437

(56) References Cited

U.S. PATENT DOCUMENTS

| | | | | |
|---|---|---|---|---|
| 5,528,583 A | * | 6/1996 | Acampora et al. | 370/54 |
| 5,875,185 A | * | 2/1999 | Wang et al. | 370/331 |
| 5,896,373 A | * | 4/1999 | Mitts et al. | 370/331 |
| 5,974,036 A | * | 10/1999 | Acharya et al. | 370/331 |
| 6,023,461 A | * | 2/2000 | Raychaudri et al. | 370/331 |
| 6,128,287 A | * | 10/2000 | Freeburg et al. | 370/331 |

FOREIGN PATENT DOCUMENTS

| | | | |
|---|---|---|---|
| JP | 10-200536 | 7/1998 | H04L/12/28 |

OTHER PUBLICATIONS

European Search Report dated Dec. 30, 2002.
XP 10265366A, J. Li et al., "Signaling Mechanisms for Handoff Control in Mobile ATM Networks", 1998, pp. 443–446.
XP 000871738, A. Acharya et al., "Design and Prototyping of Location Management and Handoff Protocols for Wireless ATM Networks", 1997, pp. 213–217.
XP 10158169A, Oliver T.W. Yu etal., "Signaling Network Architecture and Transaction Protocols to Support Realtime Connection Rerouting in ATM/B–ISDNs", 1996, pp. 1012–1019.
XP–010339355, J. Li et al., "Handoff Control for Point to Multipoint Connections in Mobile ATM Networks", Aug. 1998, pp. 2586–2591.
XP 000625718, R. Yuan et al., "A Signaling and Control Architecture for Mobility Support in Wireless ATM Networks", 1996, pp. 478–484.
XP 10268767A, Arup Acharya et al., "Mobile ATM: Architecture, Protocols, and Implementation", 1997, pp. 115–119.
XP 723641A, "Mobility Management in Wireless ATM Networks", 1997, pp. 100–109.
Raychaudhuri et al. "Rationale and framework for wireless ATM specification." ATM Forum/95–1646/PLEN, 1995.
Acharya et al. "Design and prototyping of location management and handoff protocols for wireless ATM networks." In *Proceedings of ICUPC 1997*, San Diego, Sep. 1997.
Raychaudhuri et al. "ATM–based transport architecture for multiservices wireless personal communication networks." *IEEE Journal on Selected Areas in Communications*, 12(8):1401–1414, Dec. 1994.

(List continued on next page.)

Primary Examiner—Steven Nguyen
Assistant Examiner—Duc Duong
(74) *Attorney, Agent, or Firm*—Sughrue Mion, PLLC

(57) ABSTRACT

Mobile terminal handoff control is provided for point to multipoint (PMP) connections in Mobile ATM networks. Special issues for the handoff control in all three types of PMP connections are taken care of, including cross over switch discovery and handoff path re-routing. A protocol for a PMP connections signaling mechanism is presented, which works with all three types of PMP connections and has a lossless control function. The PMP connection tree topology is protected.

15 Claims, 17 Drawing Sheets

OTHER PUBLICATIONS

Acampora et al. "An architecture and methodology for mobile–executed handoff in cellular ATM networks." *IEEE Journal on Selected Areas in Communications*, 12(8):1365–1375, Dec. 1994.

Toh. "Crossover switch discovery for wireless ATM lans." *ACM/Baltzer Mobile Networks and Nomadic Applications*, 1(2), Dec. 1996.

Yuan et al. "A signaling and control architecture for mobility support in wireless ATM networks." *ACM/Baltzer Mobile Networks and Applications*, 1(3), Dec. 1996.

Veeraraghavan et al. "Mobility and connection management in a wireless ATM LAN." *IEEE Journal on Selected Areas in Communications*, 15(1):50–68, Jan. 1997.

Mitts et al. "Lossless handover for wireless ATM." *ACM/Baltzer Mobile Networks and Applications*, 1(3), Dec. 1996.

Rajagopalan et al. "Proposed handover signaling architecture for release 1.0 WATM baseline." ATM Forum/97–0845, Sep. 1997.

Acharya et al. "Primitives for location management and handoff control in mobile ATM networks." ATM Forum/96–1121, Aug. 1996.

Acharya et al. "Mobility management in wireless ATM networks." *IEEE Communication Magazine*, 35(11):100–109, Non–overlapping. 1997.

The ATM Forum. ATM User–Network Interface (UNI) Signalling Specification, Version 4.0. ATM Forum/af–sig–0061, Jul. 1996.

The ATM Forum. Private Network–Network Interface Specification (PNNI) Version 2.0. ATM Forum/BTD–PNNI 2.00, Sep. 1997.

Li et al. "A signaling mechanism for hand–off control in mobile ATM networks." In *Proceedings of the 12th International Conference of Information Networking*, Tokyo, Japan, Jan. 1998.

* cited by examiner

HANDOFF CONTROL FOR POINT TO MULTIPOINT CONNECTIONS IN MOBILE ATM NETWORKS

BACKGROUND OF THE INVENTION

1. Field of the Invention

This invention relates to handoff control for point to multipoint connections in mobile ATM networks, and for the first time provides for handoff control for a mobile participating in a point to multipoint connection.

This invention relates to a system for handoff control in a point to multipoint mobile ATM network. The invention is embodied in a system, a method, and a program product for handoff control in a point to multipoint mobile ATM network.

2. Related Art

Asynchronous transfer mode (ATM) networks provide for point to point (PTP) and also for point to multipoint (PMP) connections. In PTP connections, one station communicates with only one other station.

In PMP connections, one station broadcasts to a plurality of other stations. The station so broadcasting may be referred to as a broadcasting station or a root station. The stations so receiving the broadcast of the root station may be referred to as receiving stations or as leaf stations. PMP connections are useful when it is desired to send a broadcast to several stations, for example, in an educational lecture setting. Using a PMP connection over an ATM network, a root station at a university could broadcast a lecture to students participating at leaf stations.

Stations in an ATM network connect to the network at switching nodes of the network. ATM switching nodes may be interconnected by links. In a PMP connection, the node to which the root station connects may be referred to as the root node of the PMP connection. Similarly, the nodes to which leaf stations connect may be referred to as leaf nodes. Obviously, a leaf node may provide service to more than one leaf station. Communication that moves in the direction away from the root station toward the leaf stations may be referred to as downstream communication; communication that moves in the direction toward the root station may be referred to as upstream communication.

FIG. 1 shows a plurality of ATM switching nodes. Some of the nodes are interconnected by links. The nodes are represented by circles, and the links are represented by straight lines between the nodes.

Today, ATM networks may include support for mobile terminals. In mobile ATM networks, a mobile terminal (or, simply, a mobile; also referred to as a MT) communicates with the ATM network via a base station (BS). The BS, for the purposes of this discussion, may conceptually be considered as part of a switching node. It is not necessary for all switching nodes to be BS's. A BS may be considered to be a special kind of switching node having communication facilities for directly communicating with MT's. Mobile ATM networks provide for handoff for PTP connections when an MT in a PTP connection moves from an area served by one BS into an area served by another BS. That is, a MT may have its PTP ATM connection handed off between different BS's. The BS that the MT leaves may be referred to as the old base station, or OldBS. The BS that the MT goes to may be referred to as the new base station, or NewBS.

Some confusion is possible in using the term "cell" when discussing mobile ATM networks. This confusion arises because mobile networks have historically used "cell" to indicate the service area of a BS. In other words, a MT moving from one cell to another will have its call handed off between an OldBS and a NewBS. In ATM networks, however, "cell" has been used to refer to the ATM cell which serves as the basic unit for protocol processing and switching. To avoid confusion, herein the term "cell" refers to the ATM cell unless otherwise indicated, and the service area of a BS will be referred to as a service area.

An ATM network may operate according to a Private Network to Network Interface (PNNI) hierarchy. The PNNI hierarchy provides for scalability of networks and is highly advantageous. The PNNI hierarchy provides that peer entities may be grouped together. A conceptual overview of the PNNI hierarchy will now be given.

FIG. 2 shows one way in which the nodes of FIG. 1 might be grouped at a high level. FIG. 2 does not show the links between the nodes for the sake of clarity.

More particularly, the nodes above the dashed line may be thought of as belonging to an overall group referred to as group B. The nodes below the dashed line may be thought of as belonging to a group A. Group A and group B are defined at the same high level, and may be referred to as peers of each other. That is, group A is a peer of group B.

FIG. 3 shows a lower level grouping of nodes. Again, the links between the nodes have been omitted for clarity. In particular, the nodes of peer group B have been grouped into groups B.1 and B.2; the nodes of peer group A have been grouped into groups A.1, A.2, A.3, and A.4. It will be appreciated that these lower level groups are peers of each other. That is, groups B.1 and B.2 are peers of each other and may also be referred to as peer groups. Groups A.1, A.2, A.3, and A.4 are peers of each other.

At its lowest level, a network may be understood to include a plurality of nodes, each which has a switching station or the like. Since these nodes are all at the same level, they are peers.

By convention, a switching node may be named based on the names of the groups of which it is a part. Thus, a switching node named A.2.1 may be in highest level group A, in the next level group A.2, and may be switching node number 1 within group A.2. Hence, the identifier or name "A.2.1". This naming convention may be referred to as a hierarchical naming convention.

FIG. 4 shows how the switching nodes in the exemplary network might be named under the foregoing convention.

The PNNI hierarchy thus provides for peer groups of an arbitrary number of levels of abstraction. The scalable PNNI hierarchy helps hide from upper levels the impact of changing the network at lower levels, and also helps hide from other peer groups any changes made inside one peer group.

To support PMP connections, a PNNI ATM network requires that a PMP connection must have a consistent tree topology at every level. More particularly, the root of the tree in a PMP connection is the root station. The leaves of the tree in a PMP connection are the leaf stations. The leaves must connect to the root via branches which do not overlap or cross. The prohibition of branch overlap/crossing allows a PMP connection to exist in harmony with the scalability of the PNNI network over all of the different levels of abstraction.

The foregoing tree topology requirement imposed by the PNNI hierarchy does not substantially affect handoff for PTP ATM connections during handoff between BS's. PTP handoff may be accomplished in a straightforward manner. The foregoing tree topology requirement does, however, pose serious implications for PMP ATM connections during handoff. In particular, unless the proper handoff control is provided, it is possible that, when a MT participating as a leaf station in a PMP connection moves from the service area of the OldBS to the NewBS, the handing off of the connection to the NewBS might cause two branches impermissibly to cross or overlap.

This situation will be explained with respect to an example and FIGS. 5–12. FIG. 5 shows the exemplary network with the switching node addresses labeled, and the links between switching nodes as straight lines. In FIG. 5, there is a root station RT which is connected to switching node B.2.4. A first leaf station, L1, is connected to switching node A.2.3. A second leaf station, L2, is connected to switching node A.4.4.

FIG. 6 shows a PMP connection established through the ATM network by which L1 and L2 receive communications from RT. In FIG. 6, peer group A.1 in its entirety, several other switching nodes, and several links have been omitted for clarity. The PMP connection is shown as a heavy, dark line. Links not part of the PMP connection are shown as faint lines. The PMP connection includes switching nodes B.2.4, B.2.3, and B.2.2 of peer group B.2; switching nodes B.1.1 and B.1.2 of peer group B.1; switching nodes A.3.2, A.3.1, and A.3.4 of peer group A.3; switching node A.2.3 of peer group A.2; and switching nodes A.4.6 and A.4.4 of peer group A.4.

FIG. 7 shows only a part of the exemplary ATM network with the PMP connection now including a third leaf which is a mobile terminal MT. The MT is in communication with switching node A.4.2, and the PMP connection includes switching nodes A.4.3 and A.4.2 in addition to the switching nodes already mentioned. Since the connection between MT and A.4.2 is a mobile communication link, it is shown as a heavy dashed line.

FIG. 8 shows the MT in a highly schematic fashion. In particular, a transmit and receive unit 10 may have an antenna ANT through which radio communications are received and sent. Connected to transmit and receive unit 10 may be a processing unit 20 which enables the MT to participate in wireless radio communications. FIG. 9 shows an exemplary switching node which is a base station in a mobile ATM network in highly schematic fashion. The terms "base station" and "switching node" may be considered to be the same for many purposes of this discussion. In particular, a base station 60 includes a base station transmit and receive unit 30 having at least one antenna ANT. The base station 60 may also have a base station processing unit 40 which controls unit 30 to receive and send radio communications through antenna ANT. The base station 60 may also include a switching unit 50 which interfaces with the links of an ATM network.

Switching unit 50 may include a processor and an associated memory. The memory may include instructions adapted to enable the processor to cause the switching unit to participate in predefined ways in the ATM network. A switching node that is not a base station might not have units 30, 40, or ANT.

FIG. 10 shows a base station BS 60 and its service area 70. Generally, a MT in the service area 70 of a BS may communicate with the switching unit 50 of the ATM network via the BS 60. FIG. 11 shows how the service areas 70 of different BS's 60 may be provided in close proximity one to another so as to provide substantially continuous communications capability.

Suppose MT, which presently is communicating via switching node A.4.2, is traveling closer to the service area of A.2.2. The signal from A.4.2 is decreasing in strength and the signal from A.2.2 is increasing. When the relative strength of these two signals reaches a certain threshold, communications should be handed off from A.4.2 to A.2.2.

FIG. 12 shows how the PMP connection would appear if such a handoff is performed in a straightforward manner. In FIG. 12, several more nodes and links not presently relevant have been omitted for improved clarity. The PMP connection is shown as being extended from A.4.2 to A.2.2 so that MT can continue to participate in the PMP connection, and MT is shown as communicating with the ATM network via A.2.2.

Such a handoff is impermissible, however, because the extension of the PMP connection between A.4.2 and A.2.2 violates the necessary tree topology. In particular, this impermissible connection would provide two branches from peer group A.3 that terminated in peer group A.2. To put it another way, those two branches may be said to "cross"or to "overlap" at peer group A.2. The required tree topology of a PMP connection in an ATM network thus would be violated.

The fact that connection handoff can violate the tree topology presents a serious problem with respect to the support of PMP connections in mobile ATM networks.

Therefore, mobility is not presently supported for PMP connections in ATM networks. Moreover, there are multiple types of PMP connections, and this further complicates handoff control. The multiple types of PMP connections will now be briefly discussed.

According to ATM Forum specifications (see background documents 12, 13), there are three types of PMP connections. The three types of PMP connections are the Root Initiated PMP connection, the Root LIJ connection, and the Network LIJ connection. Each will now be discussed in turn, but it is important to keep in mind that these three types of PMP connections are defined without regard to mobile ATM networks. In other words, these three types of PMP connections are specified for ATM networks regardless of whether the particular ATM network provides wireless access.

Root Initiated PMP connections are created by the root and only the root can initiate signaling procedure by sending an ADD PARTY message toward a new leaf.

A Root LIJ PMP connection is characterized in that it is a root prompted, Leaf Initiated Join (LIJ). Root LIJ connections allow a leaf to request to join the PMP connection by sending a LEAF SETUP REQUEST message to the root. Upon receiving the message, the root starts the signaling procedure to add this leaf by sending an ADD PARTY message toward the new leaf.

A Network LIJ PMP connection is characterized in that it is a leaf prompted Leaf Initiated join (LIJ). Network LIJ connections allow a leaf to request to join the PMP connection by sending a LEAF SETUP REQUEST message toward the root. This request message might not reach the root. The network determines whether there exists a node that qualifies as a proxy root for the leaf. If there is a proxy root for the leaf, then the proxy root (and not the "real" root) starts the signaling procedure to add the leaf by sending the ADD PARTY message toward the new leaf. In Network LIJ PMP connections, the nodes upstream of the proxy root might not notice the leaf's join because the join is handled by the proxy root. Network LIJ is the only type of ATM PMP connection in which a proxy root is used.

ATM networks have heretofore been studied and defined in various aspects. The following documents are listed for the convenience of the reader, as they contain useful background information on these various aspects, and are all incorporated by reference in their entirety for this useful background information:

Concerning the 'Mobile ATM' concept:
1. D. Raychaudhuri, R. Yuan, A. Iwata, and H. Suzuki. Rationale and framework for wireless ATM specification. ATM Forum/95-1646/PLEN, 1995.

Concerning the near term set of mobile services in a mobile ATM network:
2. Acharya, J. Li, A. Bakre, and D. Raychaudhuri. Design and prototyping of location management and handoff protocols for wireless ATM networks. In *Proceedings of ICUPC* 1997, San Diego, September 1997.

Concerning a long term migration to broadband end-to-end wireless ATM service:
3. D. Raychaudhuri and N. D. Wilson. ATM-based transport architecture for multiservices wireless personal communication networks. *IEEE Journal on Selected Areas in Communications*, 12(8):1401–1414, December 1994.

Concerning research and development into mobility support for ATM networks:
4. Acampora and M. Naghshineh. An architecture and methodology for mobile-executed handoff in cellular ATM networks. *IEEE Journal on Selected Areas in Communications*, 12(8):1365–1375, December 1994.
5. K. Toh. Crossover switch discovery for wireless ATM LANs. *ACM/Baltzer Mobile Networks and Nomadic Applications*, 1(2), December 1996.
6. R. Yuan, S. K. Biswas, L. J. French, J. Li, and .D. Raychaudhuri. A signaling and control architecture for mobility support in wireless ATM networks. *ACM/Baltzer Mobile Networks and Applications*, 1(3), December 1996.
7. M. Veeraraghavan, M. Karol, and K. Eng. Mobility and connection management in a wireless ATM LAN. *IEEE Journal on Selected Areas in Communications*, 15(1):50–68, January 1997.
8. H. Mitts, H. Hansen, J. Immonen, and S. Veikkolainen. Lossless handover for wireless ATM. *ACM/Baltzer Mobile Networks and Applications*, 1(3), December 1996.

Concerning efforts toward standardization:
9. Rajagopalan H. Mitts, K. Rauhala and G. Bautz. Proposed handover signaling architecture for release 1.0 WATM baseline. ATM Forum/97-0845, September 1997.
10. A. Acharya, J. Li, and D. Raychaudhuri. Primitives for location management and handoff control in mobile ATM networks. ATM Forum/96-1121, August 1996.

Concerning a framework for mobility support in an ATM network:
11. Acharya, J. Li, and D. Raychaudhuri. Mobility management in wireless ATM networks. *IEEE Communication Magazine*, 35(11):100–109, November 1997.

Concerning specifications for user-network and network-network interfaces:
12. The ATM Forum. ATM User-Network Interface (UNI) Signalling Specification, Version 4.0. ATM Forum/af-sig-0061, July 1996.
13. The ATM Forum. Private Network-Network Interface Specification (PNNI) Version 2.0. ATM Forum/BTD-PNNI 2.00, September 1997.

Concerning selection of a COS in PTP handoff:
14. J. Li, A. Acharya, and D. Raychaudhuri. A signaling mechanism for hand-off control in mobile ATM networks. In Proceedings of the $12^{th}$ *International Conference of Information Networking*, Tokyo, Japan, January 1998.

SUMMARY OF THE INVENTION

This invention is realized in a method of handoff for all three types of PMP connections in a mobile PNNI ATM network in such a manner as to avoid branch crossing/overlapping. The invention also is realized in a computer system and a computer program product for implementing the foregoing method.

The handoff control method provides for the discovery of a proper cross over switch which is an entry border node that covers both the old base station and the new base station. The inventive control method includes new protocol messages, a new type of cell for providing handoff without any data loss, and a new PNNI route view to support setting up of new paths for any of the three types of PMP connections.

BRIEF DESCRIPTION OF THE DRAWING FIGURES

DETAILED DESCRIPTION OF THE PREFERRED EMBODIMENTS

Figure 1:
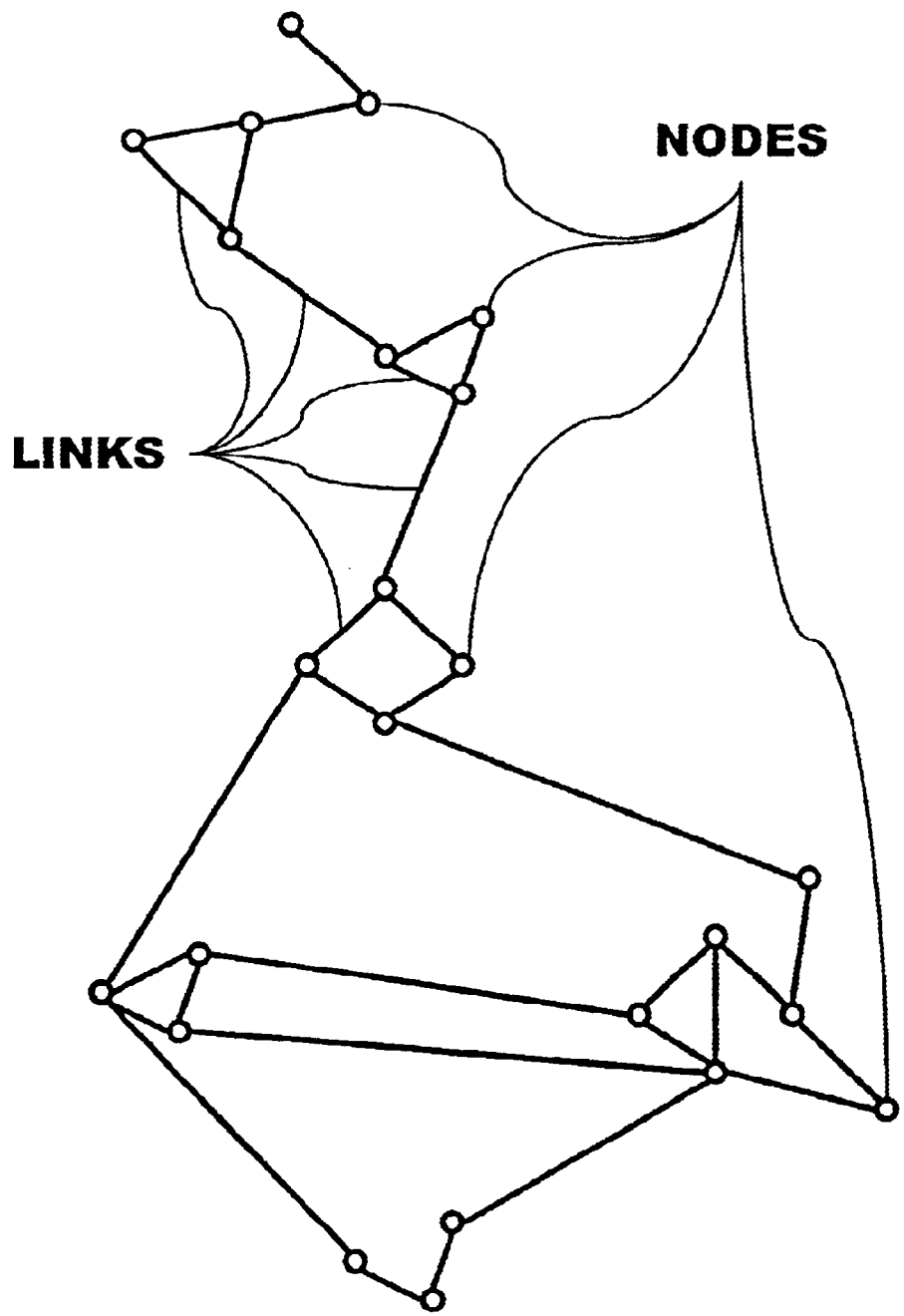
FIG. 1 depicts nodes and links in an ATM network.
Figure 2:
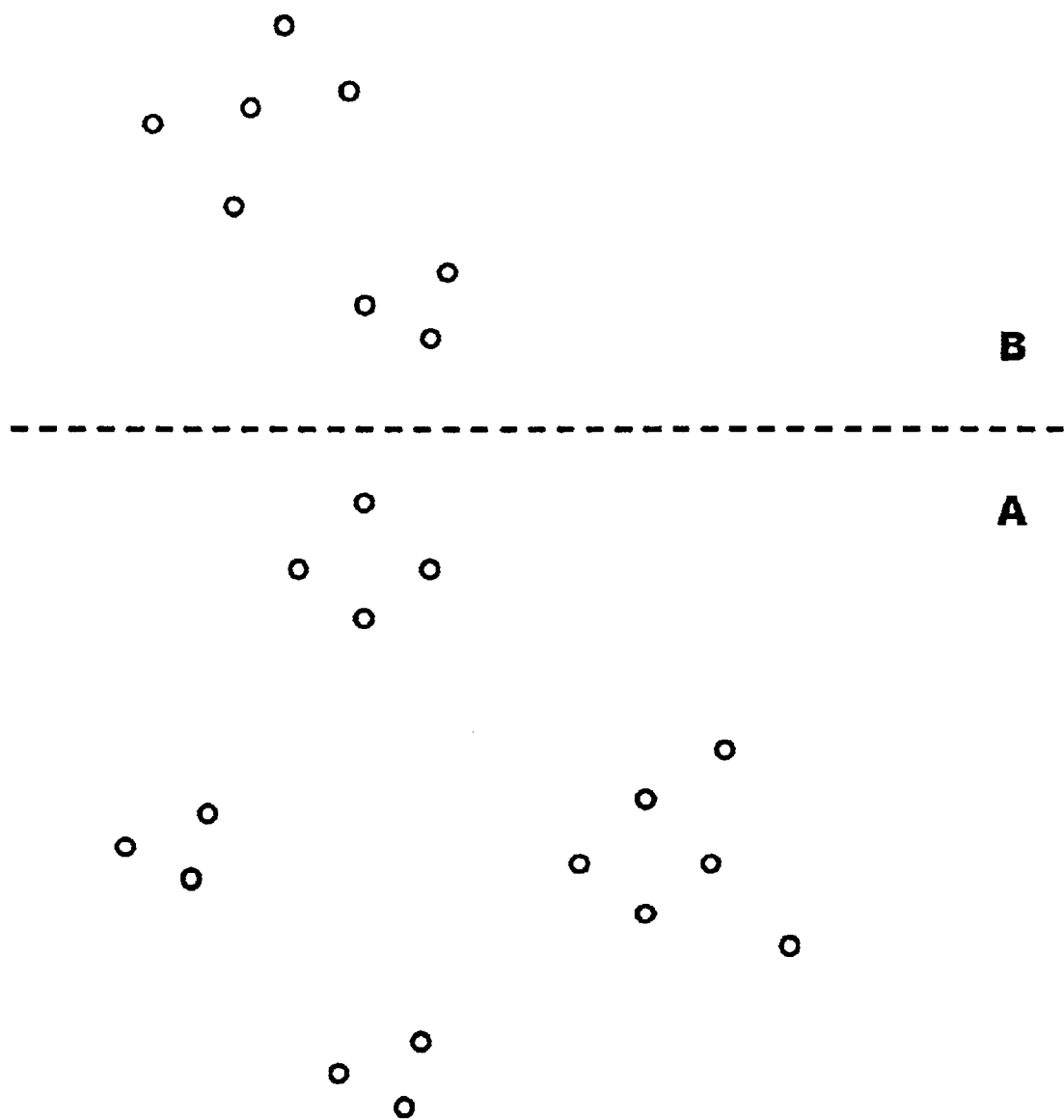
FIG. 2 depicts a high level grouping of nodes.
Figure 3:
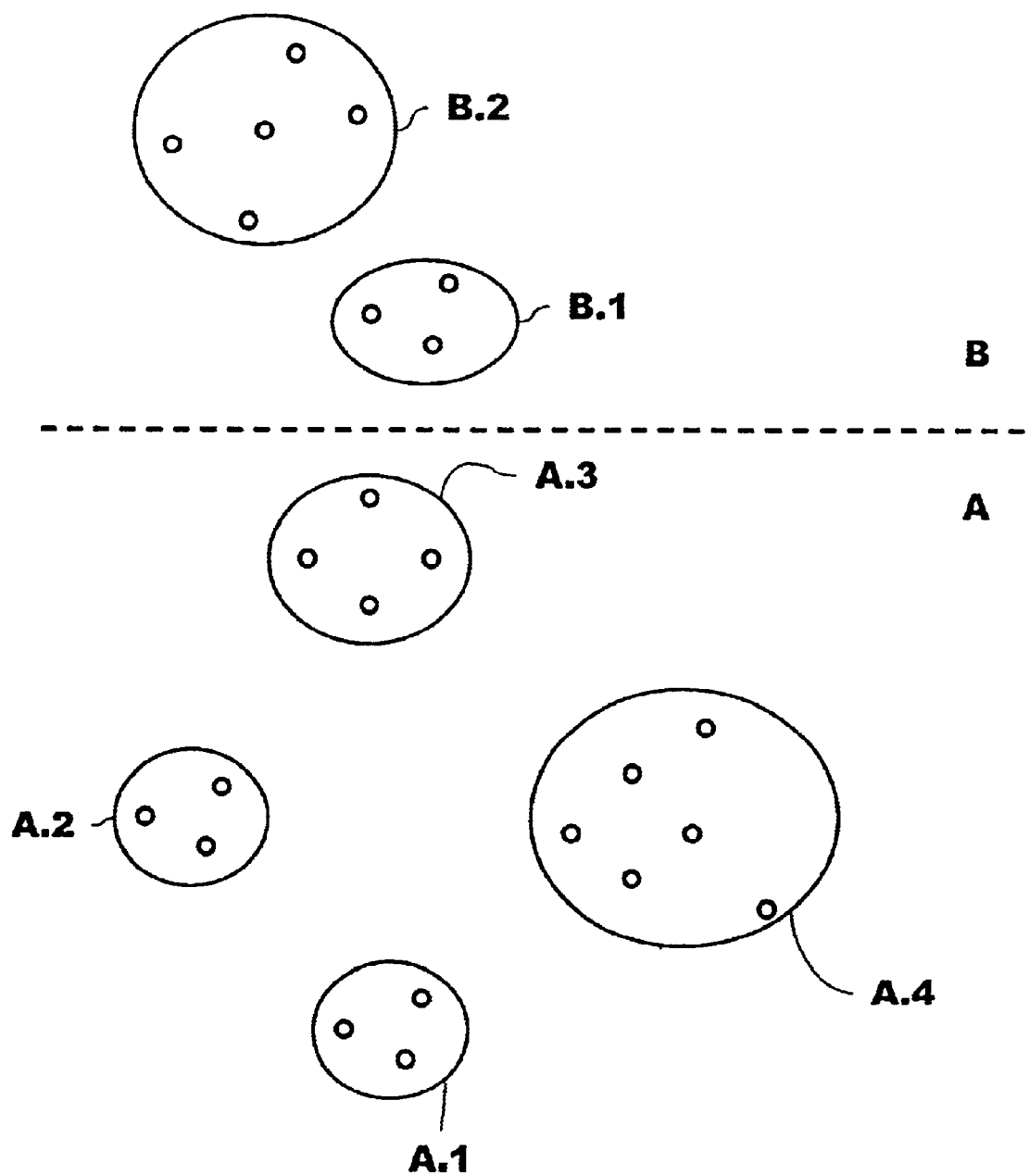
FIG. 3 depicts a next lower level grouping of nodes.
Figure 4:
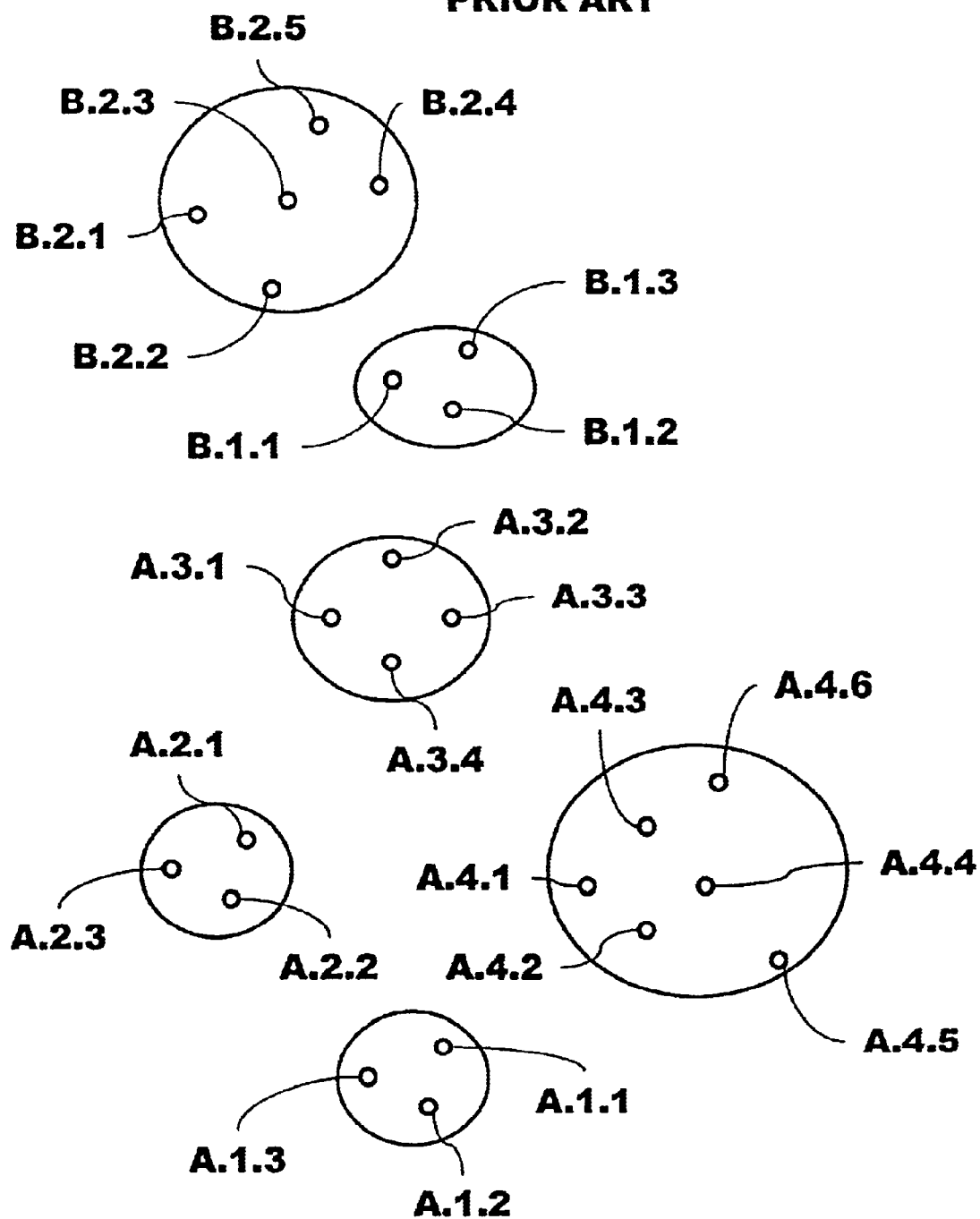
FIG. 4 illustrates an identification/naming convention.
Figure 5:
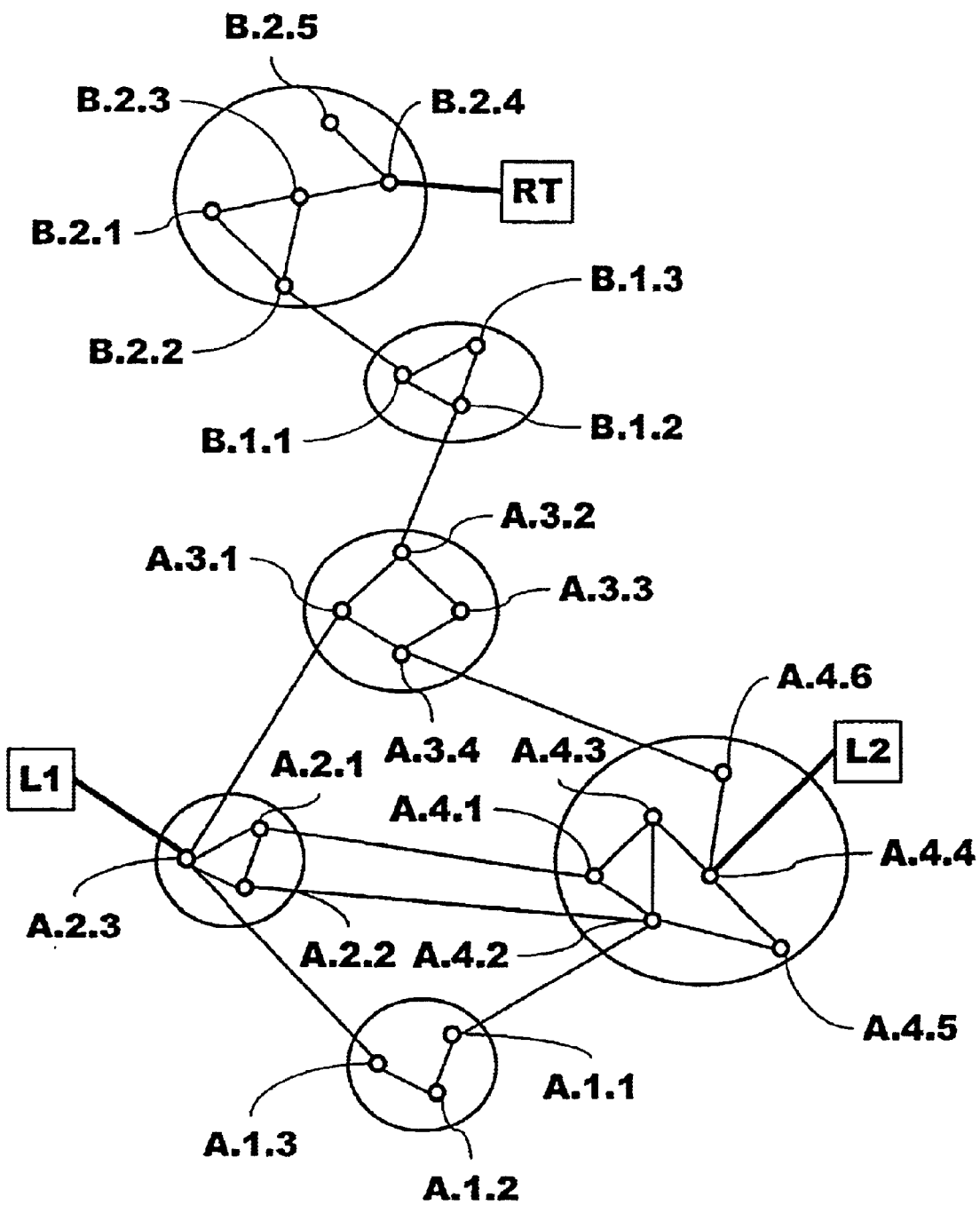
FIG. 5 depicts an exemplary ATM network for use in describing a problem with PMP handoff.
Figure 6:
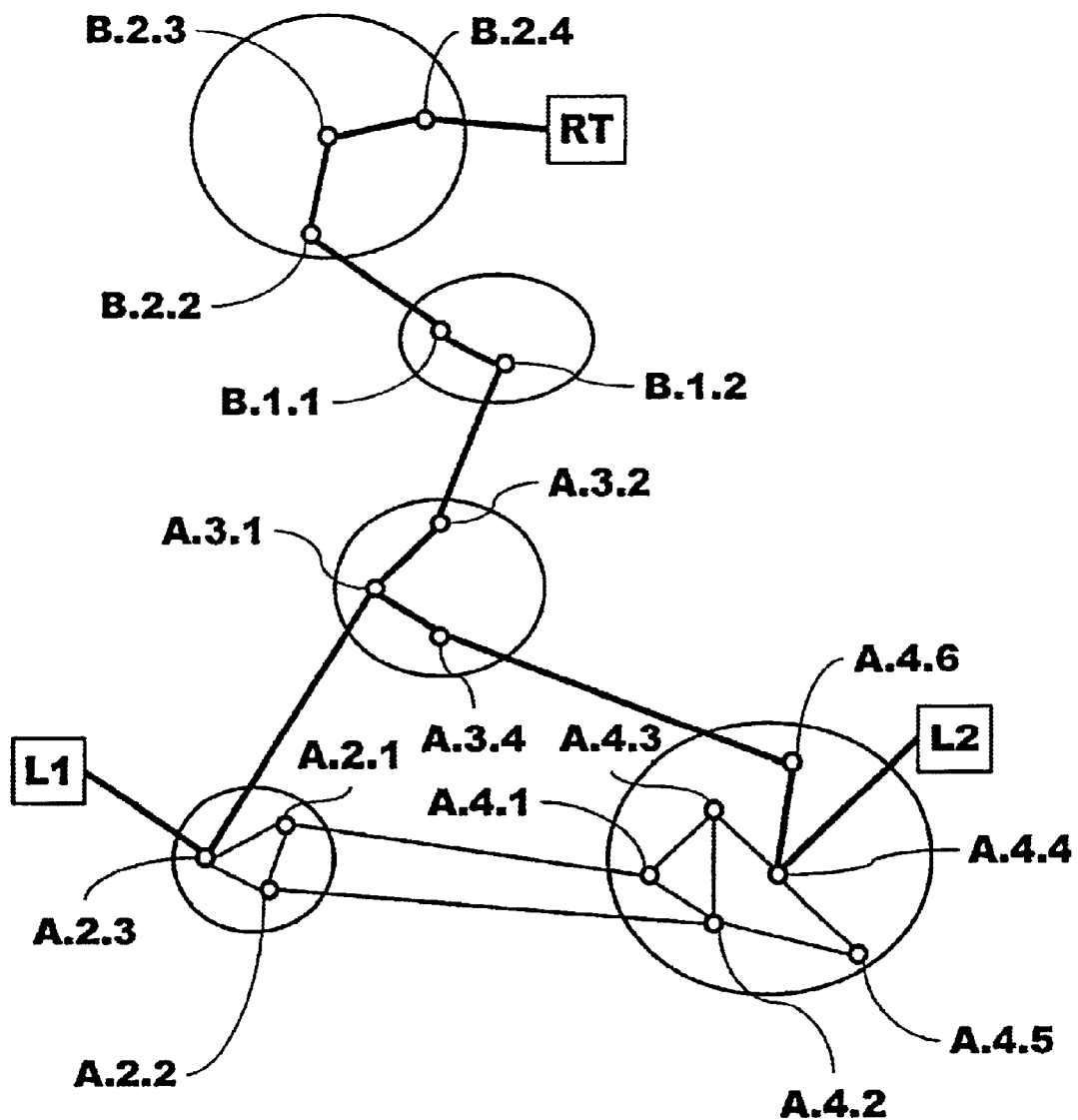
FIG. 6 shows a PMP connection in the exemplary ATM network.
Figure 7:
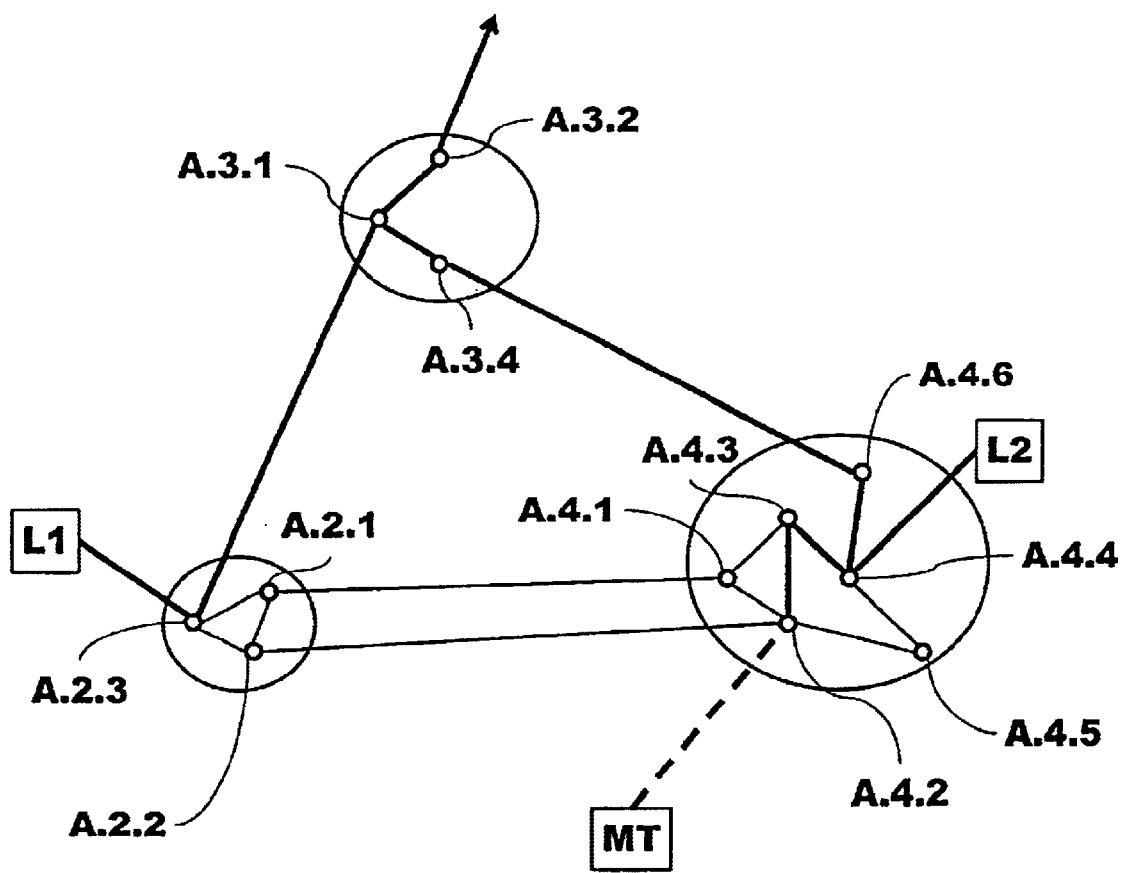
FIG. 7 shows a small part of the exemplary ATM network including a mobile participating in the PMP connection.
Figure 8:
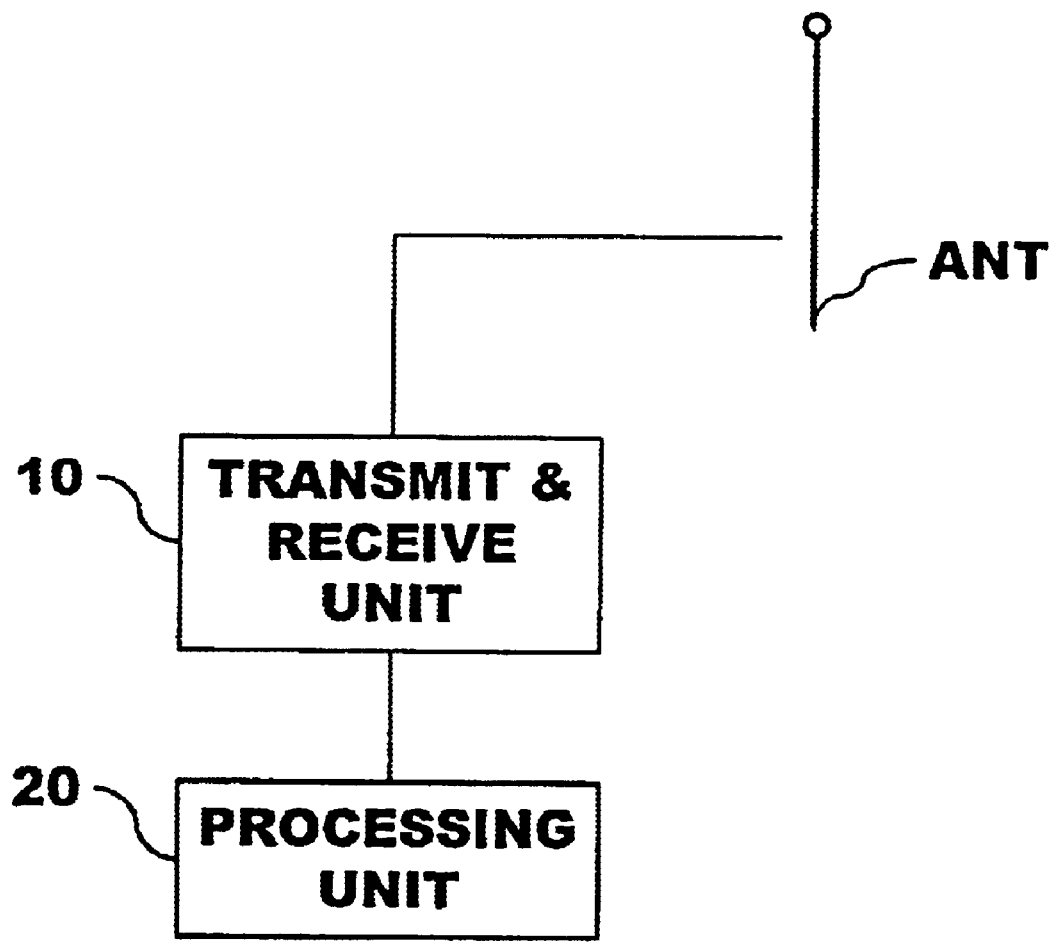
FIG. 8 shows, in schematic form, a mobile.
Figure 9:
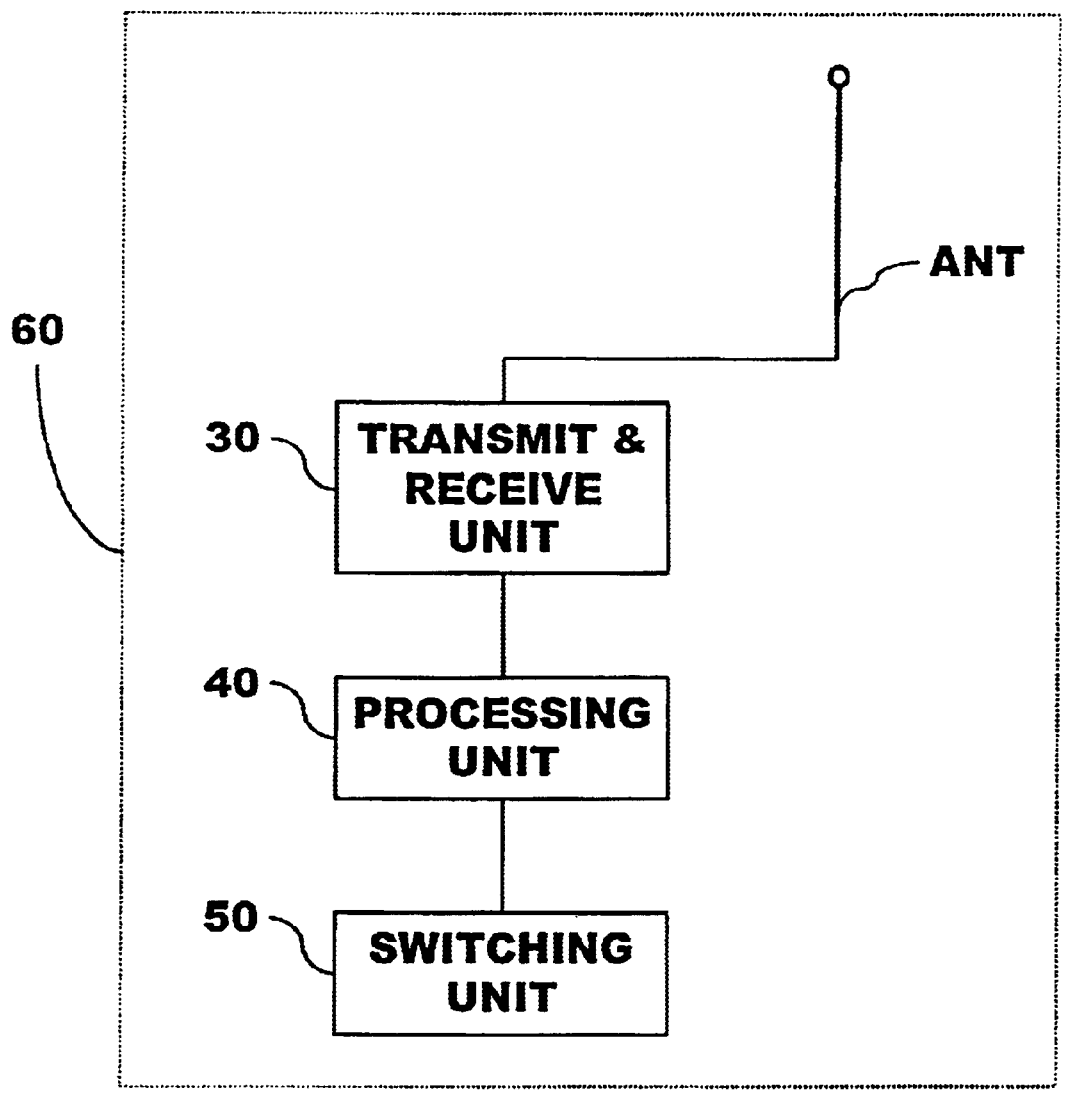
FIG. 9 shows, in schematic form, a switching node.
Figure 10:
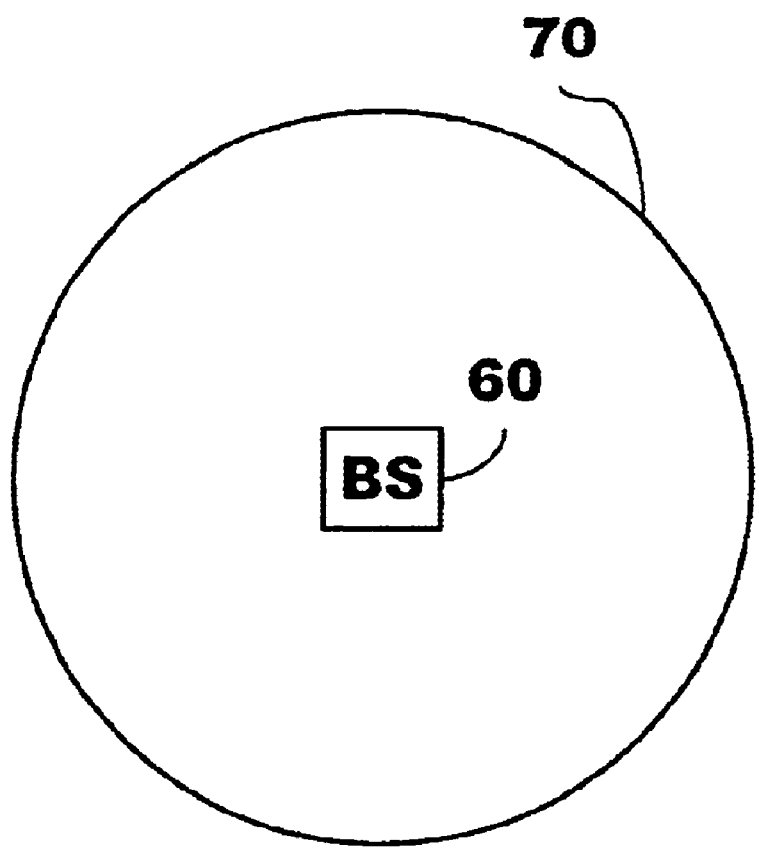
FIG. 10 illustrates the concept of a service area of a base station.
Figure 11:
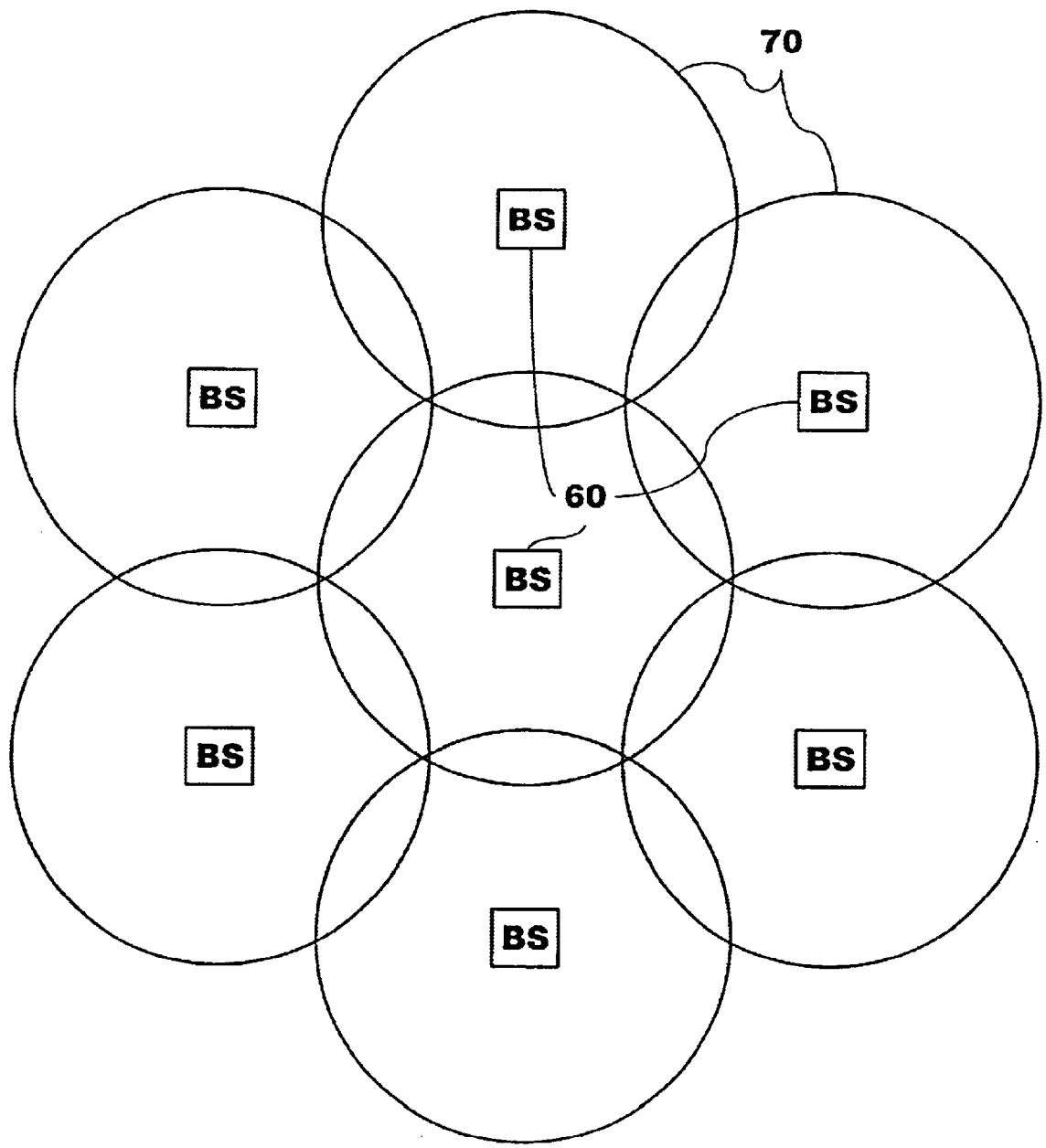
FIG. 11 illustrates the concept of multiple, overlapping service areas.
Figure 12:
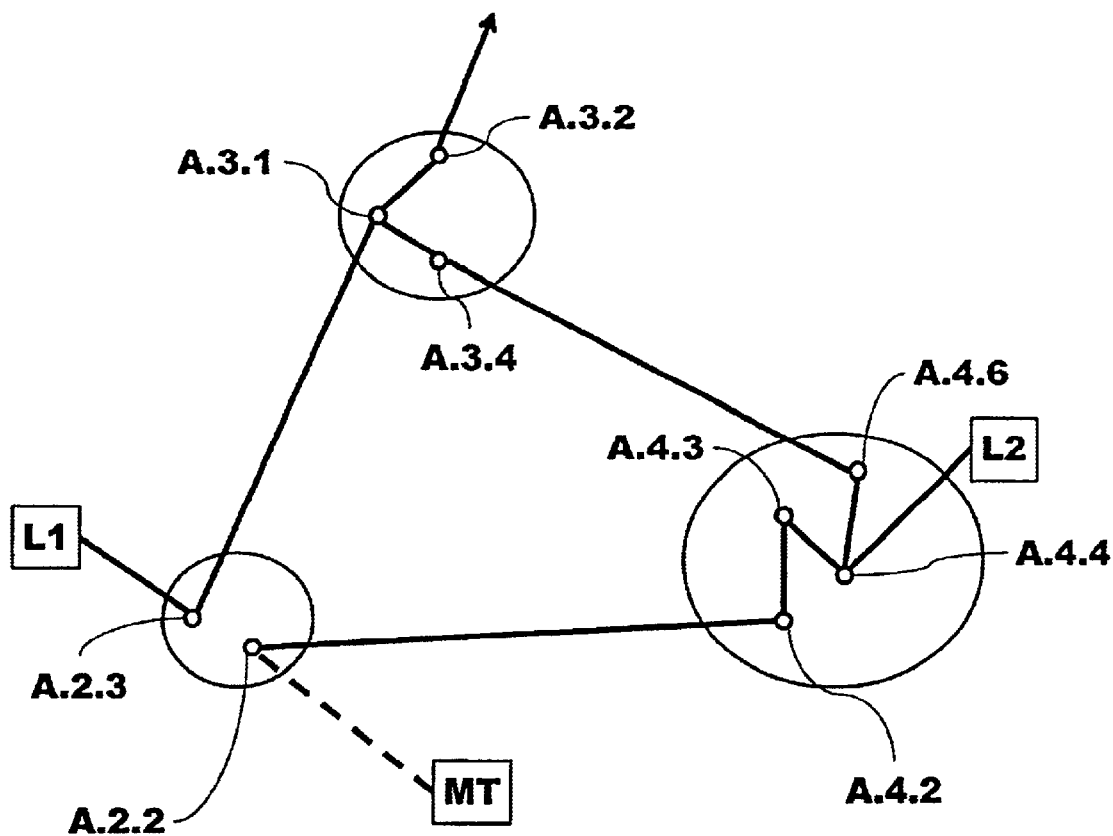
FIG. 12 shows an impermissible PMP connection.
Figure 13:
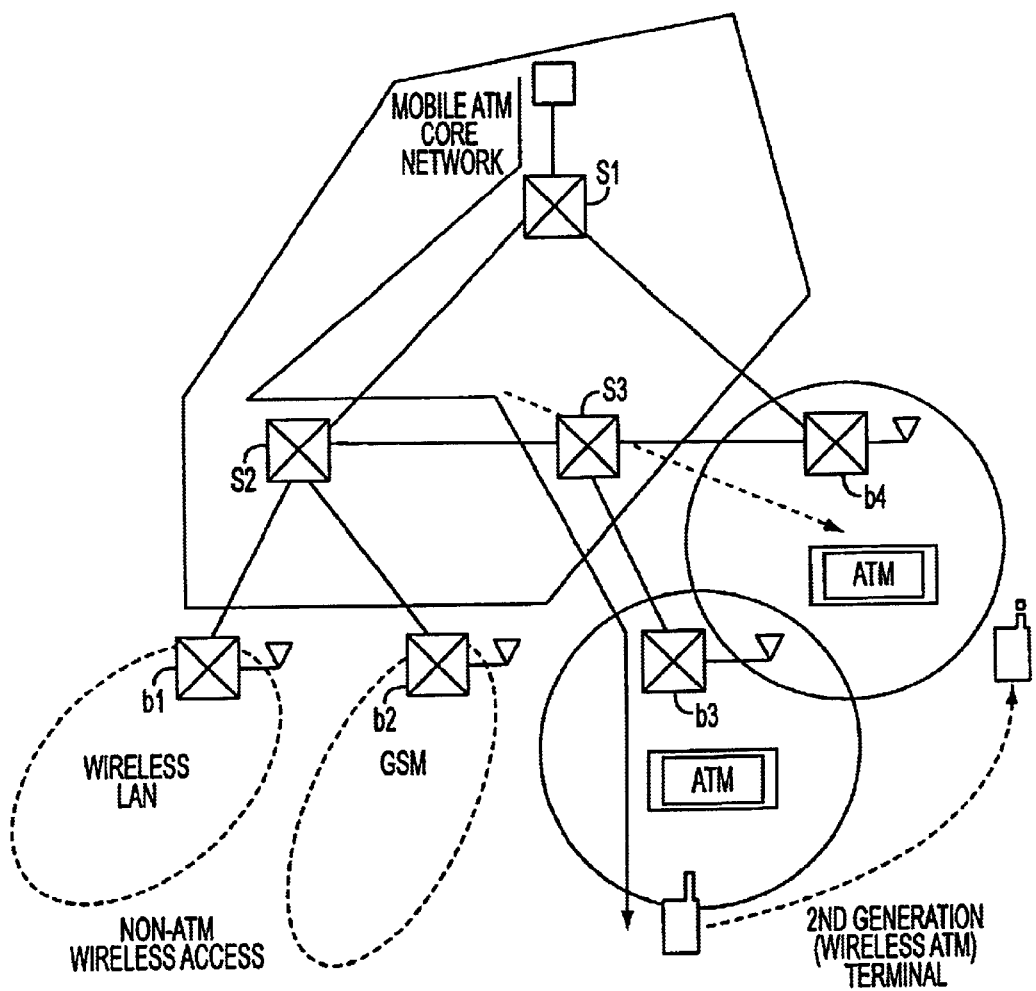
FIG. 13 depicts a Mobile ATM network.
Figure 14:
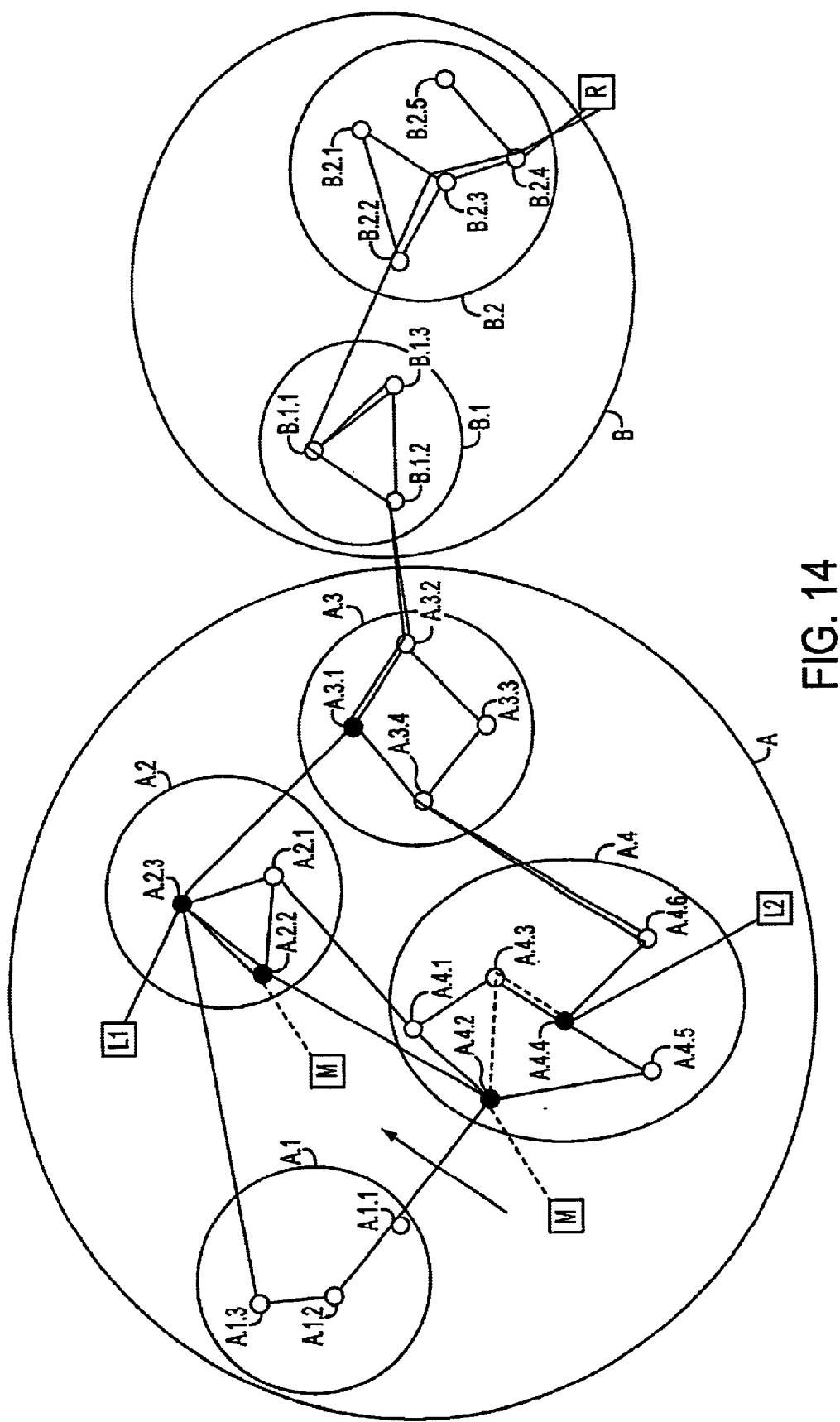
FIG. 14 depicts a PMP connection in a PNNI network.

A PNNI ATM network may conceptually be viewed as shown in FIG. 13. A PMP connection in a PNNI ATM network is shown in FIG. 14. As already mentioned, a PMP connection may not have any overlapping of branches between nodes. This means that only the first leaf in a peer group can be added with a branch crossing the border of the peer group to the PMP tree; the rest of leaves in the peer group must be added with the branches within the peer group. This requirement is imposed because, at any level of PNNI hierarchy, a PMP connection must have a tree topology.

To avoid branch overlapping in a regular (i.e., non-mobile) PMP connection, a Connection View is established for each node on the PMP tree (see background documents 12, 13 for more detailed information on a connection view) The connection view of a node is a tree graph rooted at the node. The view is specific to each node, and may be different depending on which of the three types of PMP connections is being used. The PNNI routing algorithm can use a node's connection view to determine the Designate Transit Lists (DTLs) along with the existing path on the tree toward the new leaf to be added. Without the connection view, a parallel path to the existing path might unnecessarily be created for adding a new leaf to the PMP connection.

Actually, it is not strictly necessary for all the nodes on the PMP connection to have a connection view. Only the nodes responsible for PNNI source routing must have it.

An entity in mobility-supporting PMP connections is the Entry Border Node (EBN).

For a PMP connection, the EBN of a peer group is defined as, from the upstream of the connection, the first node in the peer group which is on the PMP tree. For example, B.1.1 is the EBN for peer group B.1 and A.3.2 is the EBN for peer group A.3 and higher level peer group A. Since root nodes and EBN's are responsible for PNNI source routing, they must maintain a connection view.

The inventive handoff control for PMP connections performs incremental path re-routing for MT's which is similar to that performed for PTP connection handoff. However, the tree topology requirement also has to be met. This path re-routing in the invention is maintained with the available topology information already provided in a node's connection view, as will be seen below.

Handoff Control Functions

Figure 15:
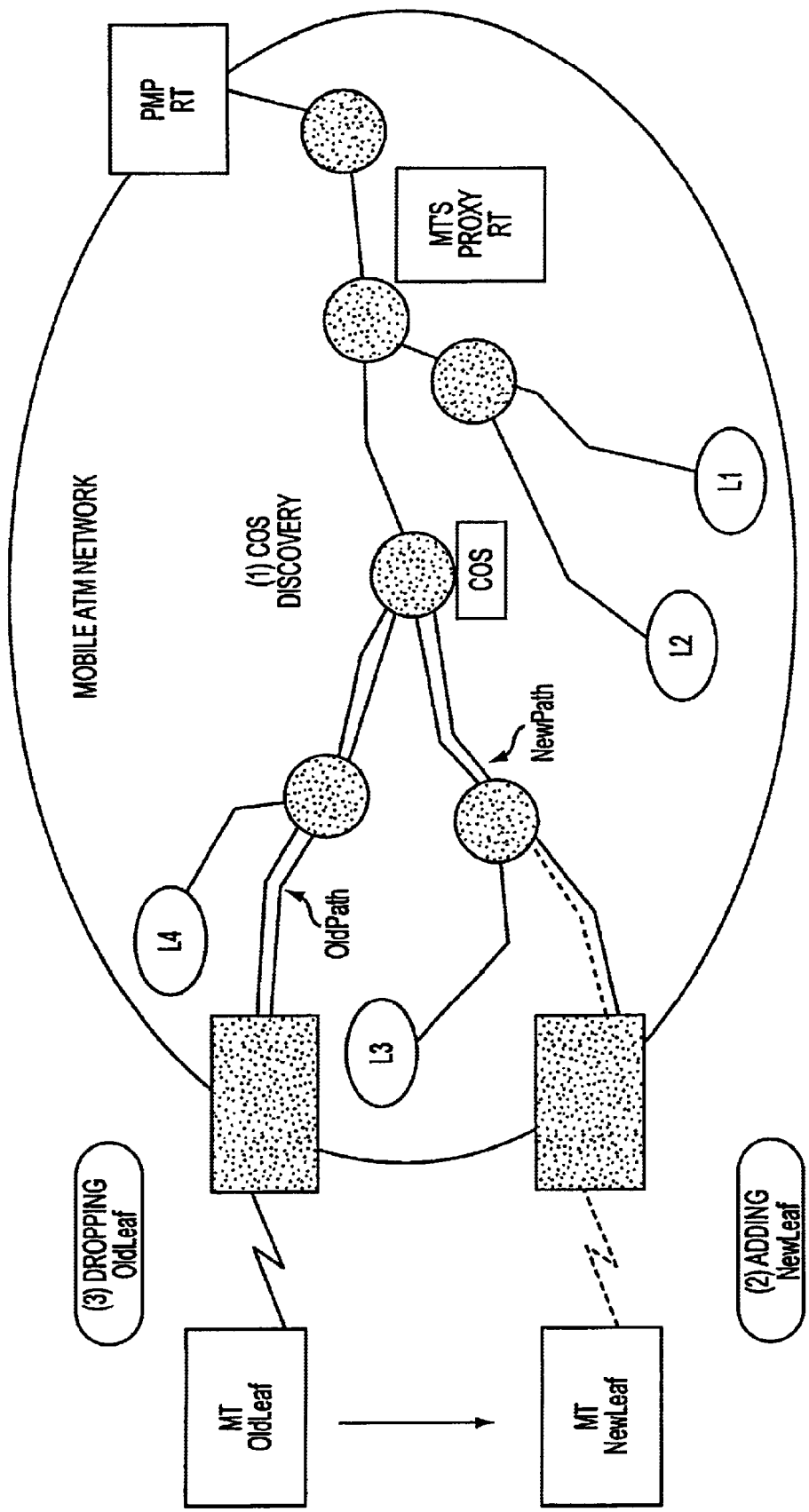
FIG. 15 depicts handoff control functions and participating Entities.

The RT is assumed to be fixed. According to the invention, a MT, as a leaf of a PMP connection, can seamlessly become a new leaf of the PMP connection through a handoff control process when the MT moves from one wireless access point to another wireless access point (i.e., from one service area to another). The network entities which may be involved in the handoff process for a PMP connection are shown in FIG. 15. They are a MT, the root (RT) or the proxy root of the MT (the RT is not necessarily aware the handoff control procedure), the Original Base Station (or old base station: OldBS) covering the service area in which the MT currently is located, the New Base Station (NewBS) covering the service area into which the MT is about to enter, and the Cross Over Switch (COS).

The MT at the OldBS may be referred to as an old leaf (OldLeaf) and at the NewBS as a new leaf (NewLeaf). The connection path between the OldBS and the COS is referred to as an old path (OldPath) and that between the NewBS and the COS may be referred to as a new path (NewPath). In FIG. 15, S1 is marked as the proxy root for the MT. In practice, a COS may be upstream, downstream, or at an equal position with respect to the MT's root or proxy root.

The handoff control includes the following primary functions so as to maintain the connectivity of a mobile user to a PMP connection in the network: (1) COS discovery, (2) adding the MT as the NewLeaf from the COS, (3) dropping the MT as the OldLeaf from the COS. When adding the NewLeaf, it is possible that a part of the NewPath is already on the PMP tree (such as from S3 to S5). When dropping the OldLeaf, the OldPath is released at the point at which no more leaves exist downstream (between the OldBS and S4 if no more mobile at the OldBS).

COS discovery for a PMP connection handoff is different from the "discovery" of a proxy root in a Network LIJ PMP connection. It also is different from the COS discovery for a PTP connection handoff. In fact, the handoff for a PTP connection may use as a COS any node on the original path from the OldBS to the last switch attached by the fixed host (see background document 14). However, the selection of COS in a PMP connection is very restrictive due to the non-overlapping requirement of the PMP connection. According to the invention, a PMP COS has to be an EBN whose peer group covers the OldBS and the NewBS. With this requirement, handoff control process is consistent for all three types of PMP connections.

Handoff Control Process

The PNNI Route View

Three types of PMP connections are different in (1) who may initiate the joining request (root or leaf) and/or (2) who may initiate the adding procedure (root or proxy root). The connection view of a node may be different in the three different types of connections. For example, a leaf added in a Network LIJ connection through a proxy root might not be in the view of some upstream nodes, while in other two types, every downstream leaf is in the view of an upstream node.

However, when the leaf information is taken out of the connection view, the result is the same for all three types of PMP connections. In other words, when the leaf information is removed, a uniform view results at a given node regardless of which of the three PMP connection types is being used. According to the invention, such a uniform view, called the PNNI Route View of a node, is used to accomplish PNNI source routing while avoiding branch overlap. For all three types of PMP connections, a PNNI is route view is at least maintained at (1) the root and (2) every EBN of the connection.

The PNNI route view is advantageous because it provides the same useful routing view in all three types of connections by taking into account topology information available already (i.e., by using a subset of the existing connection view). Therefore, handoff control can be accomplished in a uniform manner.

Preliminary Actions

Now some preliminary actions, or prerequisite actions, will be mentioned. These actions relate to providing a PMP tree that is capable of supporting the PMP handoff of the invention.

As a PMP connection is being set up, one important action is that each EBN know that it is an EBN. That is, when one node (an upstream node, closer to the root) arranges with another node (a downstream node, further from the root) for a PMP connection, the downstream node must examine the address of the upstream node. If the address of the upstream node indicates that the upstream node is from a different peer group than the downstream node, then the downstream node is an EBN for that peer group. Depending on the difference of address, the downstream node may be an EBN for a higher level peer group.

In FIG. 14, for example, node A.3.2 receives a request for setting up a PMP connection from node B.1.2. Node A.3.2 can readily determine that the request is coming from a node in peer group B. Thus, node A.3.2 knows at least from the difference in address from the upstream station that it (node A.3.2) is the EBN for peer group A. This necessarily means that node A.3.2 is also the EBN for peer group A.3. These facts follow from the requirement that the PMP connection be a tree at every level without overlap or crossing of branches.

When node A.3.2 sends a message to node A.3.1 to set up a part of the PMP connection, node A.3.2 is the upstream node and node A.3.1 is the downstream node. Node A.3.1 can tell, from the address of the upstream node A.3.2, that the PMP connection already has reached peer group A, as well as peer group A.3. From the similarity of the address of node A.3.2 to its own address, node A.3.1 can tell that it (node A.3.1) is not an EBN.

As the PMP connection is being set up, therefore, each node may store a value in a memory location associated with the connection which indicates whether the node is an EBN or not. It would be possible also to not store any value relating to whether a node is an EBN, and to derive this information whenever such information becomes necessary. That is, whenever a node needed to know whether the node was an EBN or not, the node could compare the address of the upstream node in the PMP connection with its own address, and then make a determination as to the node's own EBN status.

For convenience, whether a node is an EBN or not may be referred to as the EBN status of the node. For this discussion, it will be assumed that each node memorizes its own EBN status when a PMP connection is being set up. Thus, as the PMP connection expands or contracts with respect to different nodes, the RT and the EBN's all also memorize and update the PNNI Route View.

There will now be described a common handoff control protocol for all three types of the PMP connections, using the common available information—the node's PNNI Route View.

PMP COS Discovery

The COS initiates the adding procedure for the NewLeaf.

Two main ways of signaling for COS discovery are foreseen in the method of PMP handoff: signaling from the OldBS, and signaling from the NewBS. In both cases, the signaling message for COS discovery must pass to an EBN of the peer group which covers the NewBS.

In the first case, the case that the signaling message is initiated from the OldBS, a COS discovery message (see PMP_HANDOFF_REQUEST message, below) with a Leaf Locator IE containing the NewLeaf's ATM address is sent upstream following the PMP tree until it reaches an EBN which covers the NewBS (i.e., until it reaches the COS). For example, in FIG. 14, the message goes from the OldBS (A.4.2) to A.3.2, the EBN of A, which covers the NewBS (A.2.2). The discovered COS is an EBN whose peer group covers both the OldBS and the NewBS.

In the second case, the signaling message for COS discovery is initiated from the NewBS.

The signaling message for COS discovery initiated from the NewBS may need to traverse upstream and/or downstream to locate the COS—an EBN of the peer group which covers both the OldBS and the NewBS. In the example, the signaling message from the NewBS (A.2.2) hits the PMP tree at the A.2.3. It should be noted that, although A.2.3 satisfies the conditions for a proxy root of the NewLeaf under Network LIJ, the COS actually is A.3.2 which covers is both A.4.2 and A.2.2.

Endpoint Reference

In a PMP connection, although all the leaves share the same data stream, each leaf is uniquely identified in the PMP tree with an Endpoint Reference for connection trace purposes. When a leaf is added on the tree, an endpoint reference is stored in the nodes from the root (or proxy root) to the node that the leaf attached to. The endpoint reference is not necessarily an end-to-end identifier. An upstream root (proxy root) may assign a number for a leaf as the endpoint reference but the number may be in use for another leaf on a downstream link (in Network LIJ). In this case, the endpoint reference can be mapped to an unused number at a node. In general, the endpoint reference can be a hop-by-hop identifier. Using the endpoint reference, the root can quickly trace a leaf along the tree without invoking PNNI routing, which can be used for any control signaling, such as dropping a leaf.

The endpoint reference for a leaf forms a path from the root (or proxy root) to the leaf. This path is referred to as a Leaf's Path on the PMP tree. For the PMP connection handoff, if the OldPath of the MT (see FIG. 15) is available at the COS, the dropping procedure of the OldLeaf can be initiated from the COS. However, in a Network LIJ connection, the MT's OldPath may not be available because its endpoint reference cannot be identified locally on the COS. This is because (1) the endpoint reference is not end-to-end between the MT and its proxy root, and (2) the COS is upstream of the MT's proxy root, which is beyond the scope of the MT's OldPath.

Although this problem can be solved by introducing new IDs and/or extending the endpoint reference from the proxy root to the COS, an embodiment of the invention provides that the problem is avoided by initiating the dropping procedure from the MT itself. How this can be done in conjunction with lossless control will now be described.

Handoff

Figure 16:
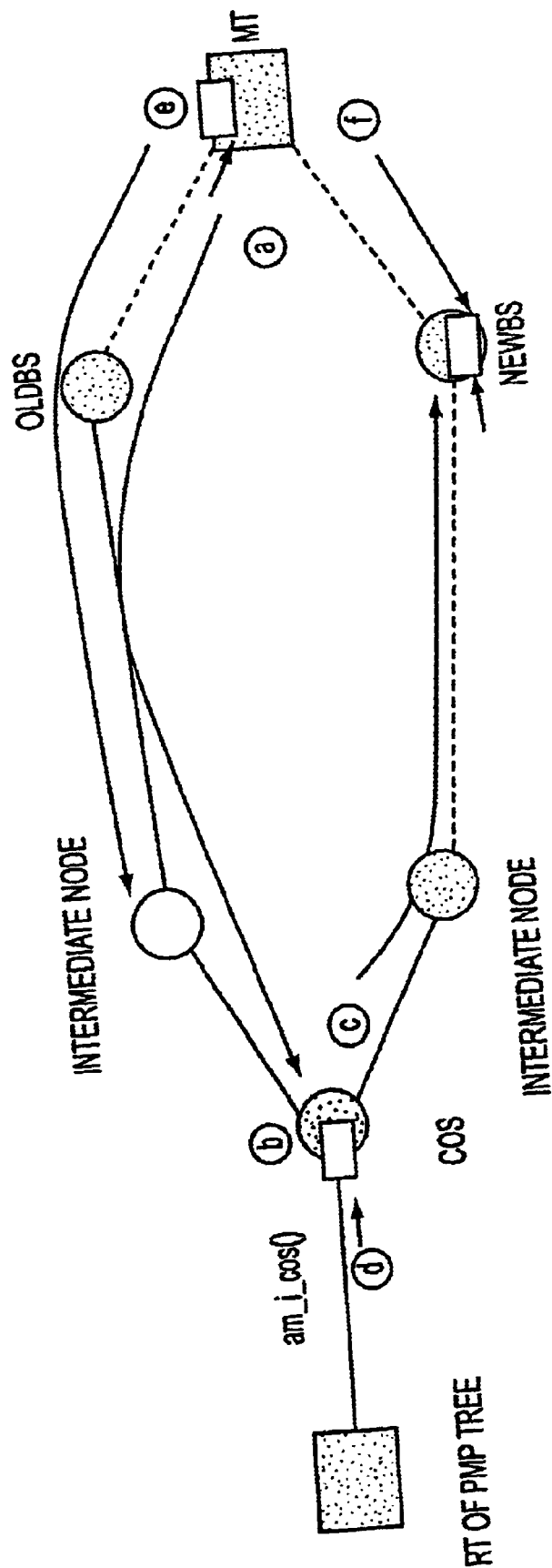
FIG. 16 depicts the handoff control process for PMP connections.

The control process of a PMP connection handoff using the OldBS COS discovery is illustrated in FIG. 16. It includes following steps. (a) Handoff initiation: a handoff request is issued from the MT at the OIdBS towards the RT. (b) COS discovery: the request traverses an EBN whose peer group covers the NewBS. (c) Adding the NewLeaf: setup a path to the NewBS, with necessary endpoint reference mapping. (d) Lossless control: using in-band signaling to synchronize stream. (e) Dropping the OldLeaf: release the path to the OldBS, delete the endpoint reference. (f) Handoff complete: the MT leave the OldBS's service area and enters the NewBS's service area.

An important issue is lossless handoff. This can be realized through in-band signaling with OAM cells. Since a PMP connection has only downstream data transmission to the MT, the lossless control can be performed as follows. A marker OAM cell can be inserted at the COS. When the MT receives the marker OAM cell from the OldBS, it requests dropping the OldLeaf and moves to the NewBS. At the NewBS, when the marker OAM cell is received, cell buffering starts until it makes sure that the MT is ready to receive data from the NewBS. The marker cells sent to the MT and the NewBS may be different in format or the same. Using an identical cell for both is preferred.

Signaling Syntax and Sequence

Figure 17:
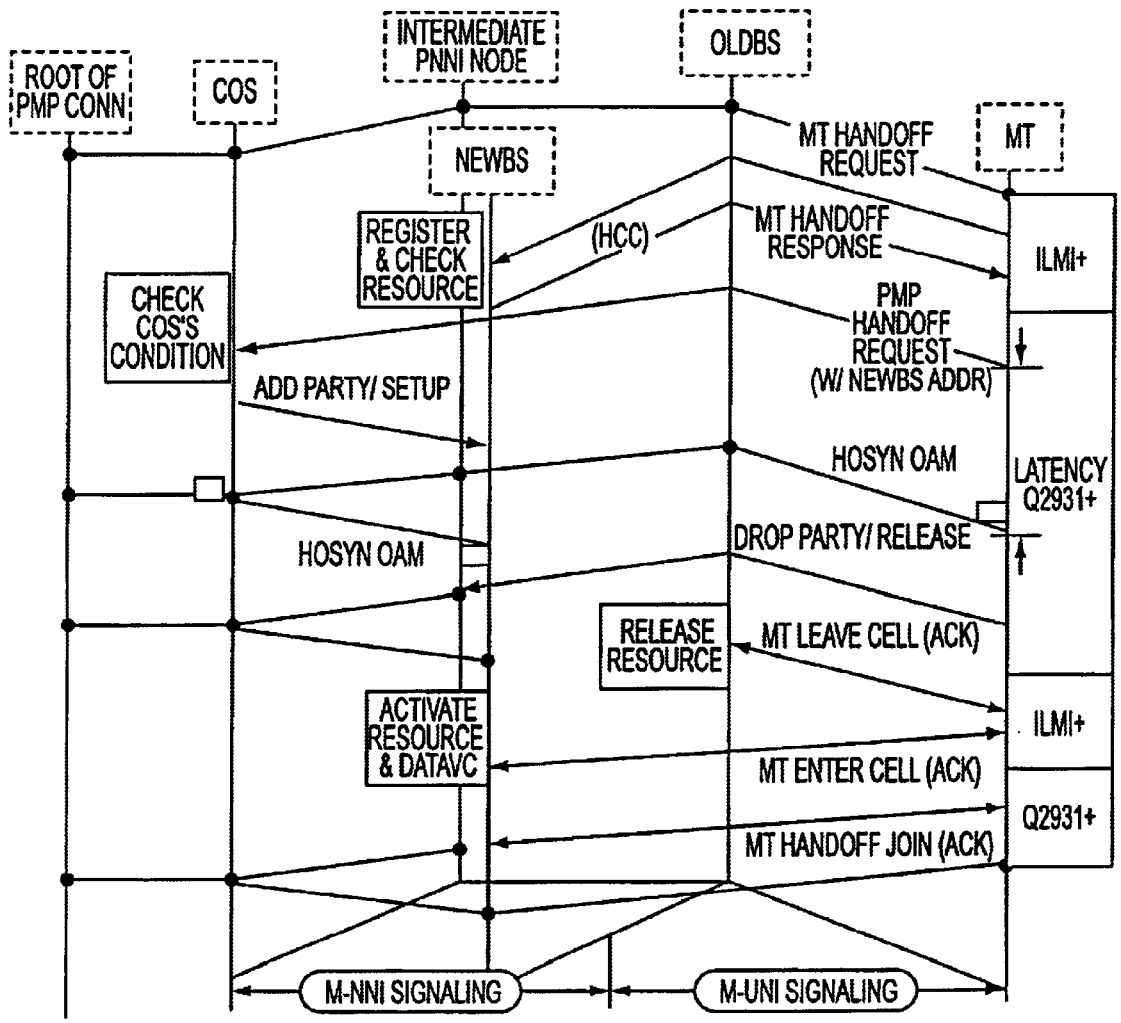
FIG. 17 depicts a signaling sequence of handoff control in PMP connections.

Based on the control process in FIG. 16, a signaling mechanism is defined by extending ATM signaling at the UNI and NNI interfaces. It includes new and modified ILMI (Interim Local Management Interface) and Q2931 signaling messages. In FIG. 17, the extension sets are represented as ILMI+ and Q2931+, respectively. New messages and modified messages are shown in time sequence. The signaling sequence can be explained from the following aspects.

Resource Registration on NewBS

Through ILMI+ signaling, a mobile ATM terminal registers on the NewBS to obtain resources, such as ATM addresses, signaling permanent virtual circuits (PVCs), and radio frequencies. The MT may not need a full registration to the NewBS as it boots up, but the resources availability must at least be checked before the handoff of the data connections. The ILMI+ messages MT_HANDOFF_ REQUEST/RESPONSE are used for resource acquisition from the NewBS. These messages may be referred to as initial handoff request and initial handoff response messages. The message MT_LEAVE_CELL releases the resources on the OldBS. The message MT_ENTER_CELL activates the using of the resources on NewBS.

If the resources at the NewBS are unavailable, this will be indicated in the response. Assuming that sufficient resources are available, the PMP handoff control process may proceed.

COS Discovery

A new message called the PMP_HANDOFF_ REQUEST message is defined for initiating the PMP handoff control process and for discovering a PMP COS. In the message, a Leaf Locator ID information element for the NewBS is included. The COS is selected when the massage traverses an EBN whose peer group covers the NewBS.

To be more particular, the MT puts into a PMP_ HANDOFF_REQUEST message at least the Leaf Locator ID of the NewBS. This message goes from the MT to the OldBS. The message is evaluated at the switching node that serves the OldBS.

Any switching node detecting a PMP_HANDOFF_ REQUEST message may evaluate the message. If the switching node is not an EBN, then there is no need to evaluate the message in detail; a non-EBN switching node may simply pass the message upstream. If a switching node receives a PMP_HANDOFF_REQUEST message, and the switching node happens to be an EBN, then the switching node must evaluate the message in detail. In particular, the switching node must determine whether it is in a peer group that covers the NewBS indicated in the PMP_HANDOFF_ REQUEST message.

An EBN may determine whether it is in a peer group that covers the NewBS indicated in the PMP_HANDOFF_ REQUEST message by performing an address/name comparison, taking advantage of the hierarchical naming convention already described above and the PNNI Route View.

If the foregoing determination indicates that the EBN is in a peer group that covers the NewBS, then the EBN is selected, or "discovered" as the COS. If the foregoing determination is to the contrary, then the EBN passes the message upstream.

Adding the NewLeaf

After the COS is discovered, an ADD PARTY/SETUP message is sent toward the NewBS. A Handoff Control Information Element (HCIE) is included in the message to indicate the message is for handoff control. A regular ADD PARTY/SETUP message ends at the user side UNI interface, but the ADD PARTY/SETUP message with HCIE can end instead at the network side UNI interface on the NewBS. In other words, there is no need to pass this message on to the user side UNI. The ADD PARTY/SETUP message with HCIE is necessary only to establish the path from the COS to the NewBS. Although the ADD PARTY/SETUP with HCIE does not reach the MT, which is not yet at the NewBS, the MT is added through the NewBS virtually.

In response to the ADD PARTY/SETUP message with HCIE, the NewBS virtually adds the MT and then replies with a CONNECT/ADD PARTY ACK to the COS. The NewLeaf is thus set is up when the CONNECT/ADD PARTY ACK is sent to the COS.

Cell Synchronization

In order to avoid cell loss or duplication, an OAM cell called a Handoff Cell Synchronization (HOSYN) OAM is introduced. After the new path for the MT is added from the COS to the NewBS, i.e., when COS receives the CONNECT/ADD PARTY ACK, the HOSYN OAM cell is inserted to the input virtual circuit (VC) at the COS. The HOSYN OAM cell may be sent to both the OldBS and the NewBS. When the NewBS receives the HOSYN OAM cell, it knows that a specific MT is in the handoff process. It will begin to buffer the cell stream upon receipt of the HOSYN until such time as a control message from the MT is received.

Dropping the OldLeaf

It will be recalled that the HOSYN may be sent to both the OldBS and the NewBS. Under the presently preferred embodiment, when the MT at the OldBS receives the HOSYN, it may send a DROP PARTY request to the root. This message has a HCIE indicating it is a handoff control message. The message goes upstream until it reaches the COS (or MT's proxy root, in a Network LIJ PMP connection, whichever is reached first).

Under an alternative embodiment, the COS itself sends is the DROP PARTY message to the OldLeaf after the HOSYN is sent out. Under this alternative, the endpoint reference for the MT must be available at the COS, and which may be accomplished via the PMP_HANDOFF_REQUEST sent earlier from downstream.

Completing the New Path

The NewLeaf is virtually added at the NewBS through the SETUP message. A new message, HANDOFF_JOIN, is used to release the cell stream buffering on the NewBS. The HANDOFF_JOIN message is sent by the MT to the NewBS. One HANDOFF_JOIN can be used for all VC's of the MT. Upon receiving the HANDOFF_JOIN message, the NeWBS releases all the buffering for the MT, including both point-to-point and point-to-multipoint connections.

It will be appreciated that the above-identified invention in all of its embodiments may be embodied in a computer system for a node or terminal in an ATM network that contains hardware and software enabling it to perform the foregoing handoff operations. Similarly, the above-identified invention may be embodied also in a computer program product, as will now be explained.

On a practical level, the software that enables the computer system to perform the above-identified approach and operations of the invention, is supplied on any one of a variety of media. Furthermore, the actual implementation of the approach and operations of the invention are actually statements written in a programming language. Such programming language statements, when executed by a computer, cause the computer to act in accordance with the particular content of the statements. Furthermore, the software that enables a computer system to act in accordance with the invention may be provided in any number of forms including, but not limited to, original source code, assembly code, object code, machine language, compressed or encrypted versions of the foregoing, and any and all equivalents.

One of skill in the art will appreciate that "media", or "computer-readable media", as used here, may include a diskette, a tape, a compact disc, an integrated circuit, a cartridge, a remote transmission via a communications circuit, or any other similar medium useable by computers. For example, to supply software for enabling a computer system to operate in accordance with the invention, the supplier might provide a diskette or might transmit the software in some form via satellite transmission, via a direct telephone link, or via the Internet.

Although the enabling software might be "written on" a diskette, "stored in" an integrated circuit, or "carried over" a communications circuit, it will be appreciated that, for the purposes of this application, the computer usable medium will be referred to as "bearing" the software. Thus, the term "bearing" is intended to encompass the above and all equivalent ways in which software is associated with a computer usable medium.

For the sake of simplicity, therefore, the term "program product" is thus used to refer to a computer useable medium, as defined above, which bears in any form of software to enable a computer system to operate in any of the described roles (i.e., MT, node, RT, EBN, COS, BTS) according to the above-identified invention.

Thus, the invention is also embodied in a program product bearing software which enables a computer to operate or participate in the foregoing handoff control method for PMP connections in a mobile ATM network according to the invention.

What is claimed is:

1. A method for control of a mobile terminal handoff for a point to multipoint connection in a mobile ATM network comprising:
    determining an identity of a new base station having a respective service area;
    making a handoff request to a current base station, along an old virtual circuit, indicating said new base station;
    evaluating, at a switching node, said handoff request to make a determination as to whether said switching node is an entry border node covering said new base station;
    when said determination is affirmative, selecting said switching node as a cross over switch;
    when said determination is negative, passing said handoff request upstream; and
    effecting said handoff under control of said cross over switch.

2. The method for control of a mobile terminal handoff for a point to multipoint connection in a mobile ATM network as set forth in claim 1, wherein the step of effecting said handoff includes:
    setting up at said new base station a new virtual circuit for said mobile terminal;
    causing said new base station to buffer cells for said new virtual circuit;
    signaling said mobile terminal to participate in said new virtual circuit; and
    signaling said new base station to release to said mobile terminal said buffered cells.

3. The method for control of a mobile terminal handoff for a point to multipoint connection in a mobile ATM network as set forth in claim 2, wherein the step of effecting said handoff further includes:
    said step of causing said new base station to buffer said cells being performed by sending to said new base station a marker cell; and
    said step of signaling said mobile terminal to participate in said new virtual circuit is performed by sending to said mobile terminal a cell identical to said marker cell.

4. A switching node adapted for control of a mobile terminal handoff for a point to multipoint connection in a mobile ATM network comprising:
    a processor, and
    a memory including software instructions adapted to enable said processor to cause the switching node to perform the steps of:
        receiving a handoff request, along an old virtual circuit, indicating a new base station for said mobile terminal;
        evaluating said handoff request to make a determination as to whether said switching node is an entry border node covering said new base station;
        when said determination is affirmative, effecting said handoff as a cross over switch; and
        when said determination is negative, passing said handoff request upstream.

5. The switching node adapted for control of a mobile terminal handoff for a point to multipoint connection in a mobile ATM network as set forth in claim 4, wherein said memory further includes software instructions adapted to enable the switching node further to perform said effecting of said handoff so as to include the steps of:
    causing said new base station to set up a new virtual circuit for said mobile terminal;
    causing said new base station to buffer cells for said new virtual circuit;
    signaling said mobile terminal to participate in said new virtual circuit; and
    signaling said new base station to release to said mobile terminal said buffered cells.

6. The switching node adapted for control of a mobile terminal handoff for a point to multipoint connection in a mobile ATM network as set forth in claim 5, wherein said memory further includes software instructions adapted to enable the switching node further to perform said effecting of said handoff so that:
    said step of causing said new base station to buffer said cells is performed by sending to said new base station a marker cell; and
    said step of signaling said mobile terminal to participate in said new virtual circuit is performed by sending to said mobile terminal a cell identical to said marker cell.

7. The switching node adapted for control of a mobile terminal handoff for a point to multipoint connection in a mobile ATM network as set forth in claim 4, further comprising:
    a base station transmit and receive unit; and
    a base station processing unit controlling said base station transmit and receive unit to receive and send radio communications with said mobile terminal.

8. A computer program product for enabling a processor of a switching node to control handoff of a mobile terminal for a point to multipoint connection in a mobile ATM network, comprising:
    software instructions for enabling the processor to perform predetermined operations, and a computer readable medium bearing the software instructions;

the predetermined operations including:
receiving a handoff request, along an old virtual circuit, indicating a new base station for said mobile terminal;
evaluating said handoff request to make a determination as to whether said switching node is an entry border node covering said new base station;
when said determination is affirmative, effecting said handoff as a cross over switch; and
when said determination is negative, passing said handoff request upstream.

9. The computer program product for enabling a processor of a switching node to control handoff of a mobile terminal for a point to multipoint connection in a mobile ATM network according to claim 8, wherein said effecting of said handoff is performed so as to include:
causing said new base station to set up a new virtual circuit for said mobile terminal;
causing said new base station to buffer cells for said new virtual circuit;
signaling said mobile terminal to participate in said new virtual circuit; and
signaling said new base station to release to said mobile terminal said buffered cells.

10. The computer program product for enabling a processor of a switching node to control handoff of a mobile terminal for a point to multipoint connection in a mobile ATM network according to claim 9, wherein:
said causing of said new base station to buffer said cells is performed by sending to said new base station a marker cell; and
said signaling of said mobile terminal to participate in said new virtual circuit is performed by sending to said mobile terminal a cell identical to said marker cell.

11. A mobile radio terminal adapted to operate in a mobile ATM network, comprising:
a processor, and
a memory including software instructions adapted to enable said processor to cause the mobile terminal, when engaged in a point to multipoint connection, to perform the steps of:
determining an identity of a new base station having a respective service area;
sending a handoff request, along an old virtual circuit, indicating said new base station;
receiving a signaling message over said old virtual circuit; and
participating in a new virtual circuit in response to said signaling message;
wherein the handoff request includes a leaf locator identifier of the new base station, and is sent toward the root node of the point to multilpoint connection.

12. The mobile radio terminal adapted to operate in a mobile ATM network as set forth in claim 11, wherein said memory further includes software instructions adapted to enable the said processor further to perform said receiving step by receiving as said signaling message a marker cell.

13. A computer program product for enabling a processor of a mobile terminal to participate in a handoff operation involving a point to multipoint connection in a mobile ATM network, comprising:
software instructions for enabling the processor to perform predetermined operations, and
a computer readable medium bearing the software instructions;
the predetermined operations including:
determining an identity of a new base station having a respective service area;
sending a handoff request, along an old virtual circuit, indicating said new base station;
receiving a signaling message over said old virtual circuit; and
participating in a new virtual circuit in response to said signaling messages;
wherein the handoff request includes a leaf locator identifier of the new base station, and is sent toward the root node of the point to multipoint connection.

14. The computer program product for enabling a processor of a mobile terminal to participate in a handoff operation involving a point to multipoint connection in a mobile ATM network according to claim 13, wherein said receiving of said signaling message comprises receiving a mark cell.

15. A method for control of a mobile terminal handoff for a point to multipoint (PMP) connection in a mobile ATM network comprising:
determining an identity of a new base station having a respective service area; then
sending an initial handoff request message from said mobile terminal to said new base station via said current base station; then
sending an initial handoff response message from said new base station to said mobile terminal, via said current base station, indicating a state of resource availability at said new base station; then
when said initial handoff response message indicates sufficient resources are available at said new base station, making a PMP handoff request to a current base station, along an old virtual circuit, indicating said new base station; then
providing said PMP handoff request to an entry border node covering said current base station and said new base station, said entry border node defining a cross over switch for said transfer; then
sending an add party message from said cross over switch to said new base station; then
setting up at said new base station a new virtual circuit for said mobile terminal in response to said add party message; then
causing said new base station to buffer cells for said new virtual circuit by sending a marker cell from said cross over switch to said new base station, and signaling said mobile terminal to participate in said new virtual circuit by sending a respective marker cell to said mobile terminal; and then
signaling said new base station to release to said mobile terminal said buffered cells.

* * * * *